United States Patent
Furusawa et al.

(10) Patent No.: US 11,975,885 B2
(45) Date of Patent: May 7, 2024

(54) DELAMINATION CONTAINER

(71) Applicant: YOSHINO KOGYOSHO CO., LTD., Tokyo (JP)

(72) Inventors: Mitsuo Furusawa, Tokyo (JP); Yoshiaki Gondo, Tokyo (JP); Kazuhiko Akiyoshi, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 930 days.

(21) Appl. No.: 16/839,963

(22) Filed: Apr. 3, 2020

(65) Prior Publication Data
US 2020/0231322 A1    Jul. 23, 2020

Related U.S. Application Data

(62) Division of application No. 15/021,311, filed as application No. PCT/JP2014/004983 on Sep. 29, 2014, now abandoned.

(30) Foreign Application Priority Data

Sep. 30, 2013  (JP) .................................. 2013-204516
Sep. 25, 2014  (JP) .................................. 2014-195646

(51) Int. Cl.
*B65D 1/02*     (2006.01)
*B29C 49/22*    (2006.01)
(Continued)

(52) U.S. Cl.
CPC ............ *B65D 1/0215* (2013.01); *B29C 49/22* (2013.01); *B32B 1/00* (2013.01); *B32B 3/04* (2013.01);
(Continued)

(58) Field of Classification Search
USPC ....................................................... 264/215
See application file for complete search history.

(56) References Cited

U.S. PATENT DOCUMENTS

| | | |
|---|---|---|
| 5,301,838 A | 4/1994 | Schmidt et al. |
| 7,482,047 B1 | 1/2009 | Tremley et al. |

(Continued)

FOREIGN PATENT DOCUMENTS

| | | |
|---|---|---|
| CA | 2880954 A1 | 5/2014 |
| JP | 2004-196357 A | 7/2004 |

(Continued)

OTHER PUBLICATIONS

Farrell, C., WO-9118795-A2 patent, PCT-US, B65D17/28, May 1991. (Year: 1991).*

(Continued)

*Primary Examiner* — S. Behrooz Ghorishi
*Assistant Examiner* — Gregory C. Grosso
(74) *Attorney, Agent, or Firm* — Oliff PLC

(57) ABSTRACT

A method for producing a delamination container, wherein the delamination container includes an outer layer body constituting an outer shell of the container and an inner layer body that is laminated on an inner side of the outer layer body in a manner such that the inner layer body is peelable from the outer layer body. The inner layer body comprises an ethylene-vinyl alcohol copolymer resin, and is deformable to undergo volume reduction and the outer layer body includes an outer layer body's inside sub-layer that is located adjacent to the inner layer body and that is made of a polypropylene resin and an outer layer body's outside sub-layer that is located on an outer side of the container relative to the outer layer body's inside sub-layer and that is made of a polyethylene resin. The method comprises a process to form the delamination container by co-extruding (Continued)

resins in a molted state to prepare a cylindrical laminated parison and blow molding the prepared laminated parison.

6 Claims, 2 Drawing Sheets

(51) Int. Cl.
| | | |
|---|---|---|
| B32B 1/00 | (2006.01) | |
| B32B 3/04 | (2006.01) | |
| B32B 7/06 | (2019.01) | |
| B32B 7/12 | (2006.01) | |
| B32B 7/14 | (2006.01) | |
| B32B 27/08 | (2006.01) | |
| B32B 27/28 | (2006.01) | |
| B32B 27/30 | (2006.01) | |
| B32B 27/32 | (2006.01) | |
| B32B 27/36 | (2006.01) | |
| B65D 47/08 | (2006.01) | |
| B29C 49/04 | (2006.01) | |

(52) U.S. Cl.
CPC .................. *B32B 7/06* (2013.01); *B32B 7/12* (2013.01); *B32B 7/14* (2013.01); *B32B 27/08* (2013.01); *B32B 27/28* (2013.01); *B32B 27/306* (2013.01); *B32B 27/308* (2013.01); *B32B 27/32* (2013.01); *B32B 27/36* (2013.01); *B65D 47/0804* (2013.01); *B29C 49/04* (2013.01); *B29C 2949/3042* (2022.05); *B29C 2949/3092* (2022.05); *B32B 2250/24* (2013.01); *B32B 2250/44* (2013.01); *B32B 2272/00* (2013.01); *B32B 2307/406* (2013.01); *B32B 2307/50* (2013.01); *B32B 2307/536* (2013.01); *B32B 2307/718* (2013.01); *B32B 2307/724* (2013.01); *B32B 2307/7242* (2013.01); *B32B 2307/734* (2013.01); *B32B 2307/748* (2013.01); *B32B 2439/00* (2013.01); *B32B 2439/40* (2013.01); *B32B 2439/60* (2013.01); *B32B 2439/70* (2013.01)

(56) References Cited

U.S. PATENT DOCUMENTS

| | | |
|---|---|---|
| 2005/0147778 A1 | 7/2005 | Tai et al. |
| 2006/0141189 A1 | 6/2006 | Akiyama et al. |
| 2015/0210788 A1 | 7/2015 | Okamoto et al. |

FOREIGN PATENT DOCUMENTS

| | | | | | |
|---|---|---|---|---|---|
| JP | 2007-320645 | A | | 12/2007 | |
| JP | 2008-110791 | A | | 5/2008 | |
| JP | 2008-207860 | A | | 9/2008 | |
| JP | 2008207860 | A | * | 9/2008 | ............ B65D 83/00 |
| JP | 2009-148951 | A | | 7/2009 | |
| JP | 2013-147295 | A | | 8/2013 | |
| WO | WO-9118795 | A2 | * | 6/1990 | ............ B65D 17/28 |
| WO | WO-02053341 | A1 | * | 7/2002 | ............ B29B 11/06 |
| WO | 2004/071880 | A2 | | 8/2004 | |

OTHER PUBLICATIONS

Akiyama, Y., Japanese-to-English machine translation by GooglePatents.com, with attached original WO2002053341A1 patent, PCT-JP, B29C49/22, Dec. 2001. (Year: 2001).*

Azuma, K., Japanese-to-English machine translation by Clarivate Analytics, with attached original JP2008110791A patent, B65D1/02, Jan. 2008. (Year: 2008).*

Farrell, C., WO-9118795-A2 patent, PCT-US, B65D17/28, May 1991. (Previously filed as NPL on Jul. 11, 2023.) (Year: 1991).*

Akiyama, Y., Japanese-to-English machine translation by GooglePatents.com, with attached original WO2002053341A1 patent, PCT-JP, B29C49/22, Dec. 2001. (Previously filed as NPL on Jul. 11, 2023.) (Year: 2001).*

Azuma, K., Japanese-to-English machine translation by Clarivate Analytics, with attached original JP2008110791A patent, B65D1/02, Jan. 2008. (Previously filed as NPL on Dec. 12, 2023.) (Year: 2008).*

Dec. 22, 2014 International Search Report issued in International Patent Application No. PCT/JP2014/004983.

Jan. 26, 2017 Office Action issued in Canadian Patent Application No. 2,924,280.

Apr. 26, 2017 Extended Search Report issued in Europran Patent Application No. 14847791.

Jun. 19, 2017 Office Action issued in Korean Patent Application No. 1020167006553.

Jul. 5, 2017 Office Action issued in Canadian Patent Application No. 2924280.

* cited by examiner

DELAMINATION CONTAINER

This is a Division of application Ser. No. 15/021,311 filed Mar. 11, 2016, which in turn is a National Stage Entry of PCT/JP2014/004983, filed Sep. 29, 2014, which claims the benefit of Japanese Application No. 2014-195646 filed Sep. 25, 2014 and Japanese Application No. 2013-204516 filed Sep. 30, 2013. The disclosure of the prior applications is hereby incorporated by reference herein in its entirety

TECHNICAL FIELD

The present disclosure relates to a delamination container including an outer layer body constituting an outer shell of the container and an inner layer body laminated on the inner side of the outer layer body in a manner such that the inner layer body is peelable from the outer layer body.

BACKGROUND

As a container for containing cosmetics such as face lotion, shampoo, rinse, liquid soap, food seasonings, or the like, a peelable laminated container (i.e., a delamination container) including an outer layer body that constitutes an outer shell of the container and an inner layer body that is laminated on the inner side of the outer layer body in a peelable manner and that is deformable to undergo volume reduction has been known. In such a delamination container, in response to dispensing of the content contained in the inner layer body, ambient air is introduced between the outer layer body and the inner layer body, and only the inner layer body undergoes volume reduction.

Known examples of the delamination container include a blow molded container including the outer layer body made of a polypropylene resin (PP) and the inner layer body made of a nylon resin (PA) as described in Patent Literature 1. Such a blow molded container may be obtained by preparing a cylindrical laminated parison by co-extruding the resins in a molten state through a die and by blow molding the prepared laminated parison.

CITATION LIST

Patent Literatures

PTL 1: JP 2008207860A
PTL 2: JP 2008110791A

SUMMARY

Technical Problem

Meanwhile, when the outer layer body is still made of a polypropylene resin and the inner layer body is made of an ethylene-vinyl alcohol copolymer resin (EVOH) to achieve even higher gas barrier properties in such a container, variation in dimension of the container obtained by blow molding tends to increase. As a result, a gap is formed between a mouth of a container and a dispensing plug mounted to the mouth, sometimes leading to leakage of air present between the outer layer body and the inner layer body through the gap. The variation in dimension is evident especially when a means for cutting and removing an unwanted flash above the mouth by pushing in the plug from above the laminated parison secured by mold segments during blow molding is used, along with a polypropylene resin with a high melt flow rate used in the outer layer body (for example, refer to Patent Literature 2).

As a way to address the above, an attempt has been made to improve stability in dimension by making the outer layer body with a polyethylene resin (PE). However, in this case, the peelability of an ethylene-vinyl alcohol copolymer resin as the inner layer body, with respect to a polyethylene resin, is deteriorated, and volume reduction of the inner layer body is hindered, and as a result, the content might not be dispensed smoothly.

The present disclosure is to solve the above problem, and the present disclosure is to provide a novel delamination container having high gas barrier properties and dimension stability.

Solution to Problem

One of aspects of the present disclosure resides in a delamination container, including: an outer layer body constituting an outer shell of the container; and an inner layer body that is laminated on an inner side of the outer layer body in a manner such that the inner layer body is peelable from the outer layer body, that contains an ethylene-vinyl alcohol copolymer resin, and that is deformable to undergo volume reduction. The outer layer body includes an outer layer body's inside sub-layer that is located adjacent to the inner layer body and that is made of a polypropylene resin and an outer layer body's outside sub-layer that is located on an outer side of the container relative to the outer layer body's inside sub-layer and that is made of a polyethylene resin.

The polyethylene resin may include a high-density polyethylene resin.

An innermost layer that is located on the inner side of the container relative to the inner layer body may be provided, and the innermost layer may be made of a modified polyolefin resin.

An outer shell sub-layer that is made of a resin different from the outer layer body's outside sub-layer and that is located on the outer side of the container relative to the outer layer body's outside sub-layer may be provided.

A strip-shaped adhesive layer extending between the outer layer body and the inner layer body along a center axis of the container may be provided.

The outer layer body may be provided in a bottom portion thereof with an ambient air introduction hole in the form of a bottom crack through which ambient air is introduced between the outer layer body and the inner layer body.

Advantageous Effect

Since, in the present disclosure, the inner layer body contains an ethylene-vinyl alcohol copolymer resin, high barrier properties are achieved. Furthermore, since the outer layer body's inside sub-layer is made of a polypropylene resin and the outer layer body's outside sub-layer is made of a polyethylene resin, the inner layer body may be peeled from the outer layer body smoothly, and variation in dimension of the outer layer body is reduced.

When a high-density polyethylene resin is used as a polyethylene resin, the outer layer body is imparted with moderate rigidity. In this case, by bringing the container into a tilted position, the content is dispensed mainly by its own weight. Furthermore, by imparting rigidity to the outer layer body, the outer layer body is prevented from being pressed unintentionally, and an intended amount of the content may be dispensed.

When the innermost layer located on the inner side of the container relative to the inner layer body is provided and when the innermost layer is made of a modified polyolefin resin, an ethylene-vinyl alcohol copolymer resin, through which more oxygen permeates as humidity increases, is covered with a modified polyolefin resin, through which moisture is less likely to permeate. Accordingly, high gas barrier properties are maintained.

Depending on the shape of the container, the outer layer body sometimes fails to have sufficient rigidity. In this case, the outer layer body may further include the outer shell sub-layer that is made of a resin different from the outer layer body's outside sub-layer and that is located on the outer side of the container relative to the outer layer body's outside sub-layer. With this structure, desired rigidity is maintained.

When the strip-shaped adhesive layer extending between the outer layer body and the inner layer body along the center axis of the container is provided, a part of the inner layer body is adhered and held to the outer layer body by the adhesive layer. This prevents the defects arising from middle portions of the inner layer body contacting with each other and a part of the content remaining near the bottom of the container when the inner layer body is deformed to undergo volume reduction.

When the outer layer body is provided in the bottom portion thereof with the ambient air introduction hole in the form of a bottom crack through which ambient air is introduced between the outer layer body and the inner layer body, since the ambient air introduction hole may be formed by blow molding, the additional step of providing the ambient air introduction hole is not necessary, and a production process of the container is simplified.

DETAILED DESCRIPTION

The present disclosure will be described in more detail below with reference to the drawings.

Figure 1:
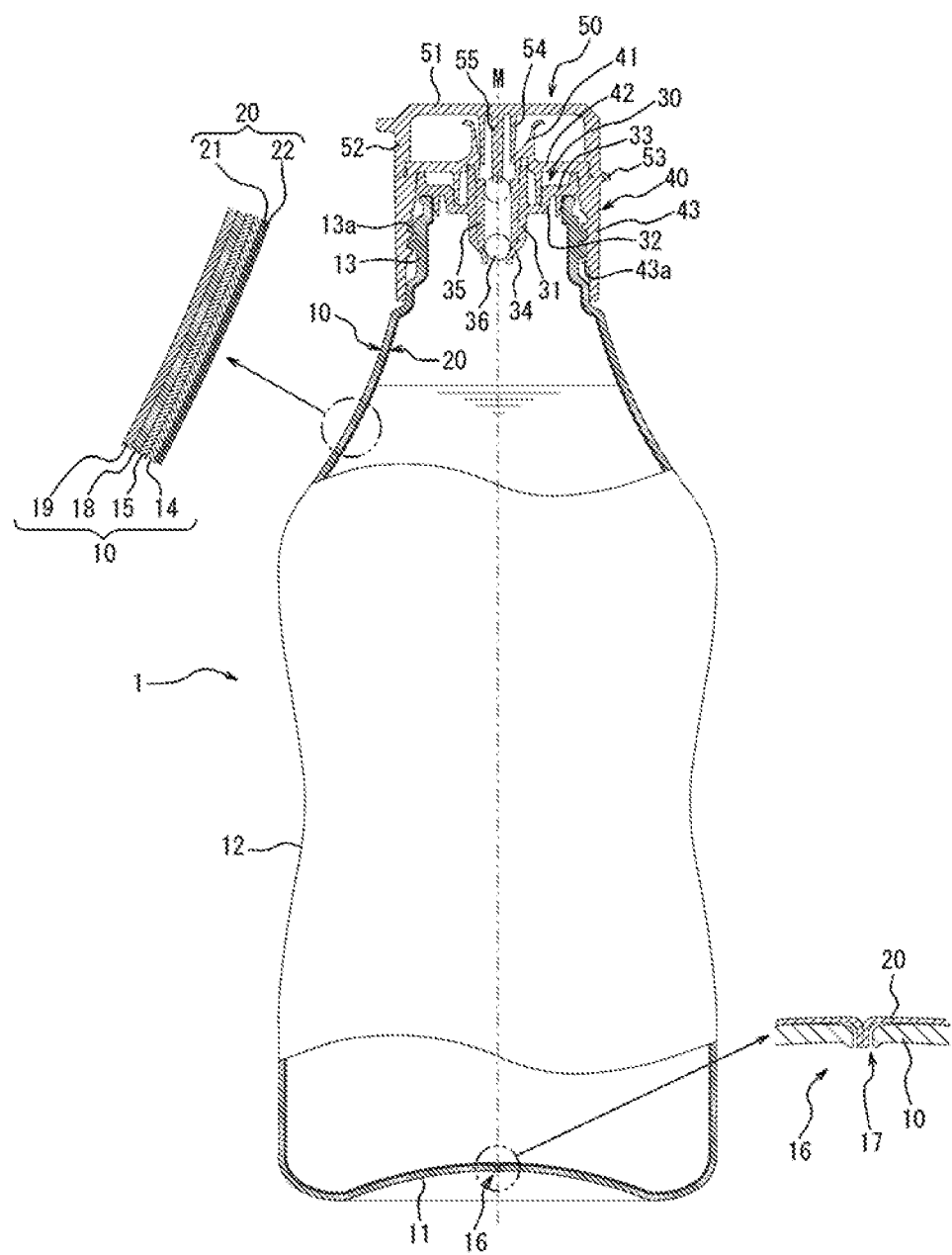
FIG. 1 is a partial sectional side view of a delamination container, and an inside plug, a dispensing plug, and a cap body according to one of embodiments of the present disclosure.

In FIG. 1, reference numeral 1 denotes a delamination container according to one of embodiments of the present disclosure. The delamination container 1 includes an outer layer body 10 constituting an outer shell of the container, and an inner layer body 20 that is laminated on the inner side of the outer layer body 10 in a manner such that the inner layer body 20 is peelable from the outer layer body 10 and that may contain the content. The outer layer body 10 has a mouth to which an inside plug 30 and a dispensing plug 40 are mounted, and a cap body 50 is detachably mounted on the dispensing plug 40.

The outer layer body 10 includes a disc-shaped bottom 11 whose middle portion is curved toward the inner side, a trunk 12 connecting to an edge portion of the bottom 11 and having a middle portion in the axial direction that is narrowed toward the inner side in the radial direction, and a mouth 13 connecting to an upper portion of the trunk 12 and having a cylindrical shape. The mouth 13 has an outer circumferential surface provided with a screw portion 13a.

The outer layer body 10 includes an outer layer body's inside sub-layer 14 located adjacent to the inner layer body 20 and an outer layer body's outside sub-layer 15 located on the outer side relative to the outer layer body's inside sub-layer 14. Herein, the outer layer body's inside sub-layer 14 is made of a polypropylene resin (PP), and the outer layer body's outside sub-layer 15 is made of a polyethylene resin (PE). Examples of the polyethylene resin (PE) include a low-density polyethylene (LDPE) and a high-density polyethylene (HDPE) resin.

As illustrated in FIG. 1, the outer layer body 10 of the present embodiment includes an outer shell sub-layer 18 located on the outer side of the container relative to the outer layer body's outside sub-layer 15. Various resins different from that of the outer layer body's outside sub-layer 15 may be adopted in the outer shell sub-layer 18. For example, a polyethylene terephthalate (PET) resin, a resin (PCTA) prepared by substituting isophthalic acid for a part of polycyclohexanedimethylene terephthalate, an ethylene-methacrylic acid copolymer ionomer resin (such as HI-Milan® manufactured by Du Pont-Mitsui Polychemicals Co., Ltd.; HI-Milan is a registered trademark in Japan, other countries, or both) may be used. Additionally, when PET, PCTA, an ethylene-methacrylic acid copolymer ionomer resin, or the like as described above is used, a modified polyolefin resin (such as Admer® manufactured by Mitsui Chemical Co., Ltd.; Admer is a registered trademark in Japan, other countries, or both) is preferably disposed between the resin and the outer layer body 10 to ensure bonding therebetween. Disposing the outer shell sub-layer 18 further hardens the outer layer body 10 and moreover, improves glossiness and contributes to superior exterior design quality.

The outer layer body 10 may further include a coating sub-layer 19 located on the outer side of the container relative to the outer shell sub-layer 18. As the coating sub-layer 19, an ethylene-vinyl alcohol copolymer resin (EVOH) is preferably used. The reason is that damage to the container is effectively prevented and that glossiness is improved. Thus, exterior design quality is further improved. Additionally, depending on compatibility between the outer shell sub-layer 18 and the coating sub-layer 19, a modified polyolefin resin may be disposed between the outer shell sub-layer 18 and the coating sub-layer 19 to further ensure bonding therebetween.

Figure 2:
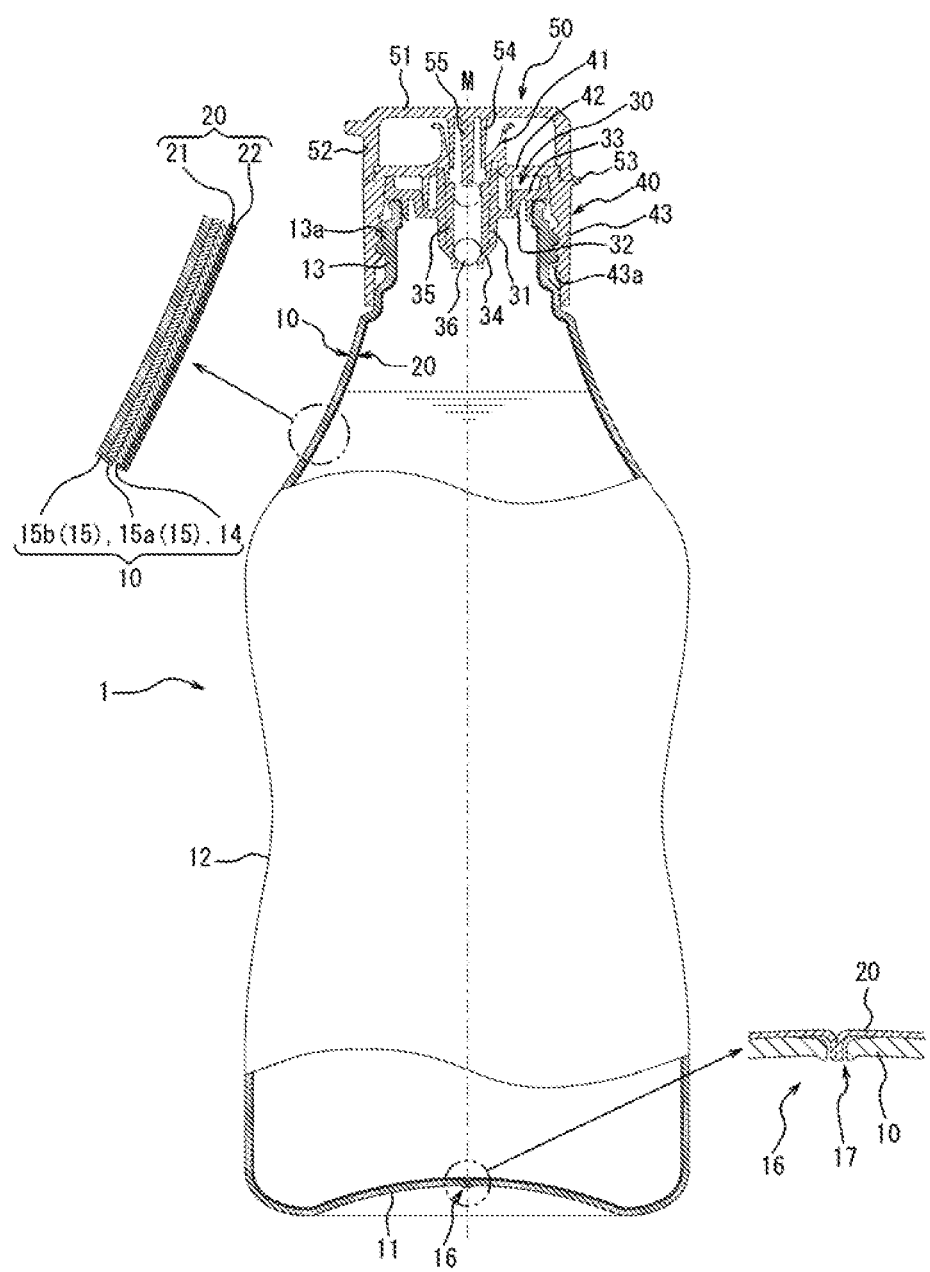
FIG. 2 is a partial sectional side view of a delamination container, and an inside plug, a dispensing plug, and a cap body according to another embodiment of the present disclosure.

The outer layer body 10 may also adopt a layer structure as illustrated in FIG. 2. The outer layer body's outside sub-layer 15 illustrated in FIG. 2 has a laminated structure of an outer layer body's first outside sub-layer 15a located on the inner side and an outer layer body's second outside sub-layer 15b located on the outer side, and the outer layer body 10 is formed by a total of three layers (the outer layer body's inside sub-layer 14, the outer layer body's first outside sub-layer 15a, and the outer layer body's second outside sub-layer 15b). Herein, the outer layer body's inside sub-layer 14 is made of a polypropylene resin (PP), and the outer layer body's outside sub-layer 15 is made of a high-density polyethylene resin (HDPE), and in detail, the outer layer body's first outside sub-layer 15a is made of a recycled material of a high-density polyethylene resin, and the outer layer body's second outside sub-layer 15b is made of a virgin material of a high-density polyethylene resin. By using a virgin material in the outer layer body's second outside sub-layer 15b, high appearance quality is achieved even though a recycled material is used in the outer layer body's first outside sub-layer 15a. The structure of the outer layer body's first outside sub-layer 15a and the outer layer body's second outside sub-layer 15b is not limited to the above example. When, for example, appearance quality does not need to be very high or may be compensated by using an exterior film or the like, to cover the outer layer body 10, is used, a recycled material may be used in both the outer layer body's first outside sub-layer 15a and the outer layer body's second outside sub-layer 15b. Furthermore, when, for example, there is not a great difference in superiority in cost, a virgin material may be used in both the outer layer body's first outside sub-layer 15a and the outer layer body's second outside sub-layer 15b. Additionally, one or more other layers may be laminated between the outer layer body's inside sub-layer 14 and the outer layer body's outside sub-layer 15.

As illustrated in FIGS. 1 and 2, the inner layer body 20 includes an inner layer body's outside sub-layer 21, which is located adjacent to the outer layer body 10 and made of an ethylene-vinyl alcohol copolymer resin (EVOH). Since more oxygen permeates an ethylene-vinyl alcohol copolymer resin as humidity increases, in the present embodiment, the innermost layer 22 is provided to coat the inner layer body's outside sub-layer 21 from the inner side to prevent direct contact between the content and the inner layer body's outside sub-layer 21. Any resin, through which moisture is less likely to permeate and which has high compatibility with an ethylene-vinyl alcohol copolymer resin, is preferably used in the innermost layer 22. Since it is preferable to use, in the innermost layer 22, the same resin as that in another member to reduce the number of types of resin, a modified polyolefin resin adopted in an adhesive layer described below is used in the present embodiment.

Between the outer layer body 10 and the inner layer body 20, although not illustrated, the strip-shaped adhesive layer extending longitudinally along a center axis M of the delamination container 1 is provided to adhere the outer layer body 10 to the inner layer body 20 partially. The adhesive layer is preferably highly compatible with both the outer layer body 10 and the inner layer body 20, and a modified polyolefin resin is used in the present embodiment. In the present embodiment, the single strip-shaped adhesive layer is provided from the bottom 11 toward the mouth 13. Two or more strip-shaped adhesive layers may also be provided.

The blow molded container 1 with the above structure may be obtained by preparing a cylindrical laminated parison by co-extruding the aforementioned resins in a molten state through a die and by blow molding the prepared laminated parison. At this time, a pinch-off portion 16 is formed when the laminated parison is pinched off at the time of closing mold segments in blow molding. Since the outer layer body's inside sub-layer 14 of the outer layer body 10 and the inner layer body's outside sub-layer 21 of the inner layer body 20, which are located adjacent to each other, are respectively made of a polypropylene resin and an ethylene-vinyl alcohol copolymer resin, which are less compatible with each other, the inner layer body 20 may be easily peeled from the outer layer body 10. As a result, in the pinch-off portion 16, there is formed an ambient air introduction hole 17 in the form of a bottom crack through which space between the outer layer body 10 and the inner layer body 20 communicates with the outside. Furthermore, since the outer layer body's outside sub-layer 15 is made of a polyethylene resin, variation in dimension of the outer layer body 10 obtained by blow molding is reduced.

The inside plug 30 in the present embodiment includes a cylindrical wall 31 extending upright in a middle portion of the inside plug 30, and an annular wall 32 connected to the cylindrical wall 31 via a flange. Furthermore, the inside plug 30 includes a flange portion 33 located in an upper end edge portion of the annular wall 32 and extending radially outward to abut against an upper end of the mouth 13. Moreover, the cylindrical wall 31 includes, in a lower end portion thereof, an inclined wall 34 having a diameter decreasing in the downward direction. Moreover, the cylindrical wall 31 includes, on an inner circumferential surface thereof, a plurality of longitudinal ribs 35 located at an interval in the circumferential direction.

Moreover, a spherical body 36 is disposed on the inner side of each longitudinal rib 35 in the radial direction. The spherical body 36 herein is displaced by its own weight along the longitudinal rib 35, and as illustrated in FIG. 1, when the delamination container 1 is in an upright position, the spherical body 36 abuts against the inclined wall 34 over the entire circumference to seal the inside of the inner layer body 20. Additionally, an upper end of the longitudinal rib 35 slightly bulges toward the inner side in the radial direction to prevent the spherical body 36 from slipping out.

The dispensing plug 40 includes a dispensing tube 41 leading to the cylindrical wall 31, and the dispensing tube 41 extends toward the outer side in the radial direction to be connected to a ceiling wall 42 located above the flange portion 33. The dispensing plug 40 also includes an outer circumferential wall 43 connected with an edge portion of the ceiling wall 42 and surrounding the mouth 13. The outer circumferential wall 43 has an inner circumferential surface provided with a screw portion 43a configured in correspondence with the screw portion 13a provided in the mouth 13. With the above structure, the dispensing plug 40 is screw fastened to the mouth 13, with the inside plug 30 being sandwiched therebetween. A lower portion of the outer circumferential wall 43 is in air tight abutment with the outer circumferential surface of the mouth 13, thereby effectively preventing leakage of air introduced between the outer layer body 10 and the inner layer body 20.

The cap body 50 includes a top wall 51 that covers an upper side of the dispensing plug 40, a circumferential wall 52 that is connected to an edge portion of the top wall 51, and a hinge 53 at which the cap body 50 is integrally connected to the dispensing plug 40. The hinge 53 may also be omitted, and the dispensing plug 40 and the cap body 50 may be provided as separate bodies that are held by, for example, screw fastening. The top wall 51 is provided, in a lower surface thereof, with a sealing tube 54 configured to abut against the dispensing tube 41 in a liquid tight manner. The top wall 51 is also provided, in a portion thereof located radially inward from the sealing tube 54, with a pin 55 extending downward. The pin 55 is designed to abut against the spherical body 36 before the spherical body 36, when being displaced upward, reaches the upper limit. This prevents the spherical body 36 from being displaced over the slip-off preventing portion provided in each longitudinal rib 35 and disengaged, even when the spherical body 36 is displaced upward forcibly due to transportation or the like.

To dispense the content from the delamination container 1 with the above structure, the cap body 50 is opened, and the delamination container 1 is brought into a tilted position. By doing so, the spherical body 36 is displaced toward the dispensing tube 41, and the content contained in the inner layer body 20 passes through an opening of the inclined wall 34 and between adjacent longitudinal ribs 38 by its own weight, and is dispensed from the dispensing tube 41. At this time, ambient air may be introduced between the outer layer body 10 and the inner layer body 20 though the ambient air introduction hole 17, and moreover, the outer layer body's inside sub-layer 14 of the outer layer body 10 and the inner layer body's outside sub-layer 21 of the inner layer body 20, which are located adjacent to each other, are respectively made of a polypropylene resin and an ethylene-vinyl alcohol copolymer resin, which are less compatible with each other. Accordingly, the inner layer body 20 may be easily peeled from the outer layer body 10, and only the inner layer body 20 may be deformed to undergo volume reduction. When a high-density polyethylene resin is used as the outer layer body's outside sub-layer, the outer layer body 10 may be imparted with moderate rigidity, and accordingly, the outer layer body 10 is prevented from being pressed unintentionally, and an intended amount of the content may be dispensed. Additionally, depending on the shape of the container, the outer layer body 10 sometimes fails to have sufficient rigidity. In this case, the outer shell sub-layer 18 and the coating sub-layer 19 as illustrated in FIG. 1 may also be provided.

As dispensing of the content progresses and the remaining amount of the content starts to decrease, due to the decreasing weight of the content as a whole, it might becomes difficult to dispense the content simply by tilting the delamination container 1. In this case, by pressing the trunk 12 of the outer layer body 10 with a more or less strong force, the inner layer body 20 is pressed by way of air present between the outer layer body 10 and the inner layer body 20. Thus, the content may be dispensed to the last. Although some of the air present between the outer layer body 10 and the inner layer body 20 might be leaked out from the ambient air introduction hole 17 when the outer layer body 10 is pressed, leakage of the air may be reduced to minimum by adjusting the extended length and thickness of the ambient air introduction hole 17 suitably.

The content may be dispensed from the delamination container 1, not by the own weight of the content but by pressure applied mainly to the outer layer body 10.

The rigidity of the outer layer body 10 may also be adjusted arbitrarily by selectively providing the outer shell sub-layer 18 and the coating sub-layer 19, in addition to the outer layer body's inside sub-layer 14 and the outer layer body's outside sub-layer 15.

Components used for dispensing the content are not limited to the inside plug 30, the dispensing plug 40, and the cap body 50 described above, and various other components that allow the content to be dispensed may be adopted.

INDUSTRIAL APPLICABILITY

According to the present disclosure, a novel delamination container having high gas barrier properties and dimension stability is provided.

REFERENCE SIGNS LIST

1 Delamination container
10 Outer layer body
11 Bottom
12 Trunk
13 Mouth
13a Screw portion
14 Outer layer body's inside sub-layer
15 Outer layer body's outside sub-layer
15a Outer layer body's first outside sub-layer
15b Outer layer body's second outside sub-layer
16 Pinch-off portion
17 Ambient air introduction hole
18 Outer shell sub-layer
19 Coating sub-layer
20 Inner layer body
21 Inner layer body's outside sub-layer
22 Innermost layer
30 Inside plug
31 Cylindrical wall
32 Annular wall
33 Flange portion
34 Inclined wall
35 Longitudinal rib
36 Spherical body
40 Dispensing plug
41 Dispensing tube
42 Ceiling wall
43 Outer circumferential wall
43a Screw portion
50 Cap body
51 Top wall
52 Circumferential wall
53 Hinge
54 Sealing tube
55 Pin
M Center axis of delamination container

The invention claimed is:

1. A method for producing a delamination container, wherein the delamination container comprises:
   an outer layer body constituting an outer shell of the container and including therein an ambient air introduction hole; and
   an inner layer body that is laminated on an inner side of the outer layer body in a manner such that the inner layer body is peelable from the outer layer body, comprises an ethylene-vinyl alcohol copolymer resin, and is deformable to undergo volume reduction; wherein
   the outer layer body comprises an outer layer body's inside sub-layer that is located adjacent to the inner layer body and that is made of a polypropylene resin and an outer layer body's outside sub-layer that is located on an outer side of the container relative to the outer layer body's inside sub-layer and that is made of a polyethylene resin, and
   the method comprises a process for co-extruding resins in a molted state to prepare a cylindrical laminated parison, forming a pinch-off portion by pinching off the laminated parison upon closing mold segments, cutting and removing an unwanted flash above a mouth by pushing in a plug from above the laminated parison secured by the mold segments, and blow molding the prepared laminated parison into the delamination container with the mold segments,
   wherein the method produces the delamination container to have a configuration such that at a time of dispensing a content from the delamination container, ambient air is introduced between the outer layer body and the inner layer body through the ambient air introduction hole such that the inner layer body is peeled from the outer layer body and the inner layer body is deformed to undergo volume reduction.

2. The method for producing a delamination container of claim 1, wherein the polyethylene resin comprises a high-density polyethylene resin.

3. The method for producing a delamination container of claim 1, wherein the outer layer body further comprises an outer shell sub-layer that is made of a resin different from the outer layer body's outside sub-layer and that is located on the outer side of the container relative to the outer layer body's outside sub-layer.

4. The method for producing a delamination container of claim 1, further comprising:
   an innermost layer that is located on the inner side of the container relative to the inner layer body and that is made of a modified polyolefin resin.

5. The method for producing a delamination container of claim 1, further comprising:
   a strip-shaped adhesive layer extending between the outer layer body and the inner layer body along a center axis of the container.

6. The method for producing a delamination container of claim 1, wherein
   the ambient air introduction hole is provided in a bottom portion of the outer layer body and is comprised of a bottom crack through which ambient air is introduced between the outer layer body and the inner layer body, and
   the method further comprises a process to form the ambient air introduction hole by peeling of the inner layer body from the outer layer body in a pinch-off portion formed when the laminated parison is pinched off at a time of closing mold segments in blow molding.

* * * * *